United States Patent [19]

Diersing et al.

[11] 3,787,713

[45] Jan. 22, 1974

[54] SERVICE SECTION SWITCHBOARD WITH HORIZONTALLY EXTENDING BUS BAR STACK AND MEANS FOR MOUNTING SOME CIRCUIT BREAKERS WITH LOAD TERMINALS FACING VERTICAL WIRING TROUGH AND OTHER CIRCUIT BREAKERS WITH LOAD TERMINALS FACING HORIZONTAL WIRING TROUGH

[75] Inventors: Raymond A. Diersing; Robert J. Morrill; Harris I. Stanback, all of Lexington, Ky.

[73] Assignee: Square D. Company, Park Ridge, Ill.

[22] Filed: Oct. 17, 1972

[21] Appl. No.: 298,320

[52] U.S. Cl. .............................. 317/119, 317/122
[51] Int. Cl. ............................................ H02b 1/04
[58] Field of Search ............ 317/112, 119, 120, 122

[56] References Cited
UNITED STATES PATENTS

| | | | |
|---|---|---|---|
| 3,491,268 | 1/1970 | Christensen | 317/112 |
| 3,619,727 | 11/1971 | Hackenbrock | 317/119 |
| 3,168,683 | 2/1965 | Brokaw | 317/120 |
| 3,346,777 | 10/1967 | Leonard | 317/119 |

Primary Examiner—Herman J. Hohauser
Assistant Examiner—Gerald P. Tolin

[57] ABSTRACT

A box of the switchboard is generally of floor-to-ceiling height and contains an upper bussed current transformer compartment with provision for a watt-hour meter. A lower compartment contains a horizontally extending stack of bus bars fed by a main circuit breaker disposed adjacent one end and on the upper side of the stack. Branch circuit breakers for relatively large loads may be plugged on the bus bars from the lower side of the stack and the load wires extended therefrom toward the bottom of the box. If desired, branch circuit breakers for relatively small loads can be accommodated by distribution panels plugged on the bus bars adjacent the other end of stack from the main circuit breaker. The smaller branch circuit breakers can then be plugged on the distribution panels and the load wires run therefrom toward a side of the box.

4 Claims, 5 Drawing Figures

PATENTED JAN 22 1974 3,787,713

FIG. 4
FIG. 5
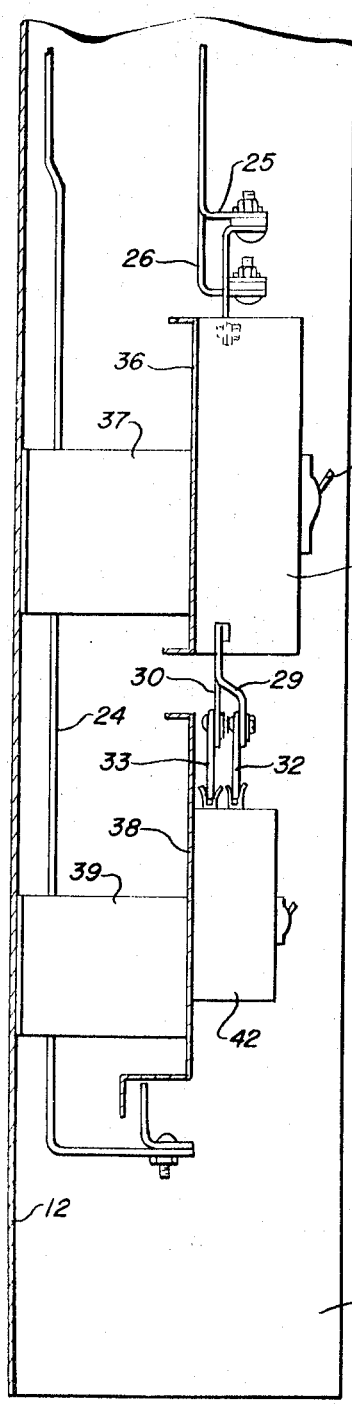
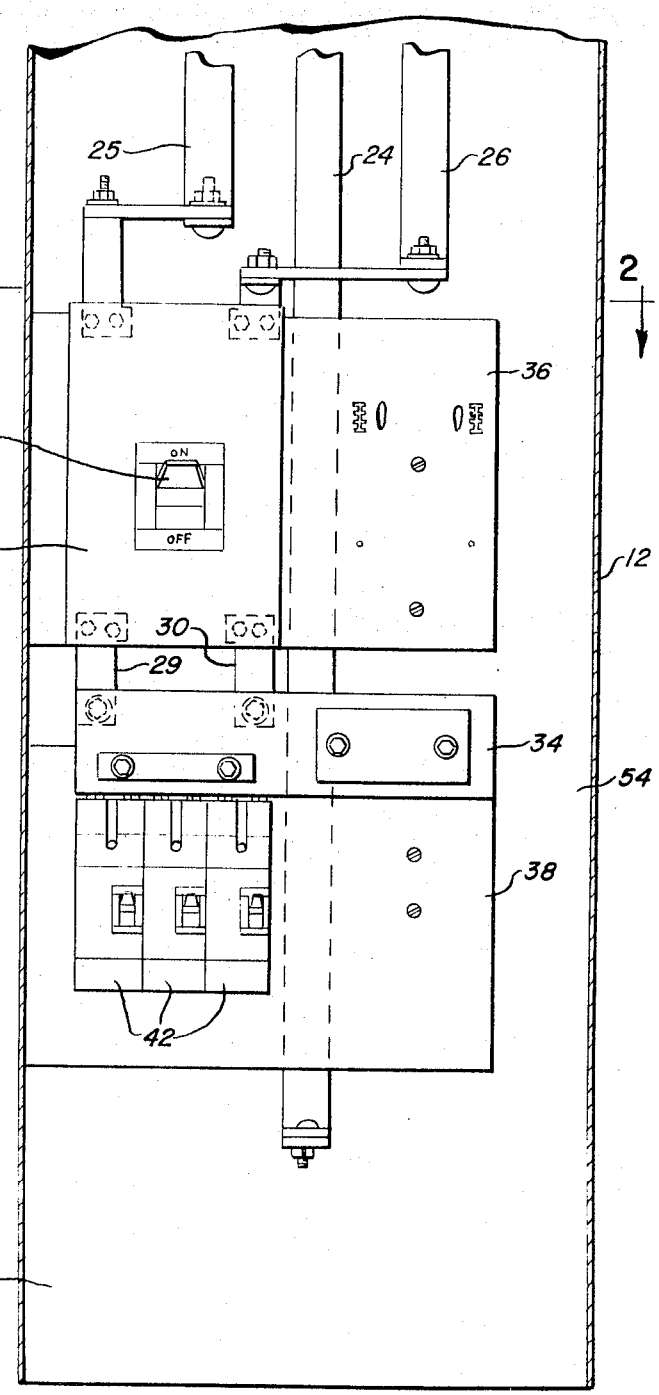

SERVICE SECTION SWITCHBOARD WITH HORIZONTALLY EXTENDING BUS BAR STACK AND MEANS FOR MOUNTING SOME CIRCUIT BREAKERS WITH LOAD TERMINALS FACING VERTICAL WIRING TROUGH AND OTHER CIRCUIT BREAKERS WITH LOAD TERMINALS FACING HORIZONTAL WIRING TROUGH

This invention relates to a service section switchboard for small commercial buildings. An object of the invention is to provide a service section switchboard having a compact and flexible arrangement of component parts.

Another object is to provide a service section switchboard in which optimum use of the space in the box is made, with all the components fitting in a relatively narrow box.

Still another object is to provide a service section switchboard having an arrangement of circuit breakers therein which results in the provision of wiring gutters extending at right angles to each other.

Other objects and advantages will become apparent when the following specification is considered along with the accompanying drawings in which:

FIG. 4 is a fragmentary sectional view taken generally along the line 4—4 of FIG. 2, with certain parts omitted for simplicity; and FIG. 5 is a fragmentary sectional view taken generally along the line 5—5 of FIG. 2, with certain parts omitted for simplicity.

Figure 1:
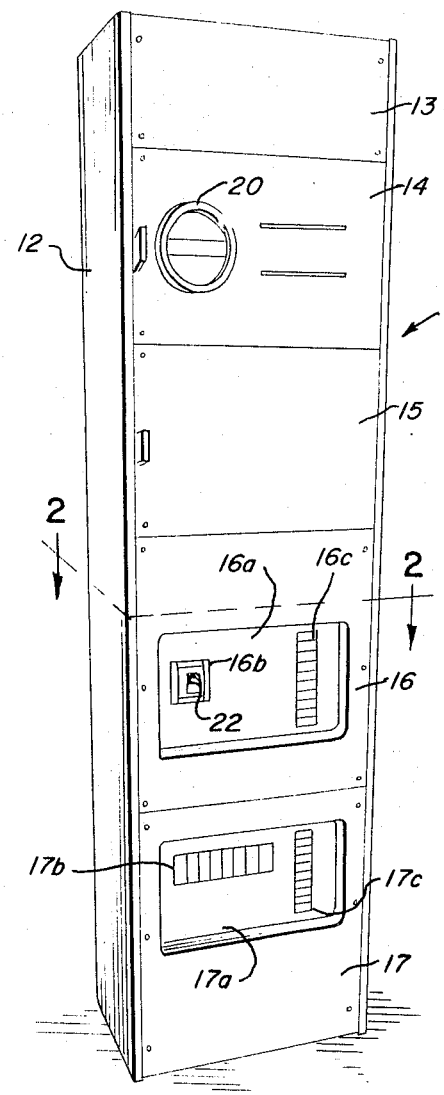
FIG. 1 is a perspective view of a service section switchboard constructed in accordance with the invention.

With reference to the drawings, a service section switchboard 10 constructed in accordance with the invention is shown in FIG. 1 and includes an open-front box 12 closed by a plurality of front cover panels 13, 14, 15, 16 and 17. In actual practice, the box 12 is a composite box made of upper and lower rectangular frames, a top panel, a rear channel, a pair of front edge posts, and a pair of horizontally divided side panels, but it is shown as a simple channel in FIGS. 2, 4, and 5. The space in the box 12 behind the panels 14 and 15 is a bussed current transformer compartment and the panel 14 is provided with a ring frame 20 for the mounting of a watt-hour meter socket and meter.

The panel 16 includes a recessed portion 16a having an aperture 16b providing access to an operating handle 22 of a main circuit breaker 23 (FIGS. 2, 4 and 5) which may be either of the type disclosed in U.S. Pat. No. 3,355,685, issued Nov. 28, 1967, or of the type disclosed in U.S. Pat. No. 3,525,837, issued Aug. 25, 1970. The recessed portion 16a is also scored to provide a plurality of removable knockout portions 16c.

The panel 17 includes a recessed portion 17a scored to provide a first plurality of removable knockout portions 17b and a second plurality of removable knockout portions 17c.

The space in the box 12 behind the panels 16 and 17 is a circuit breaker compartment. In the embodiment of the invention shown, the switchboard 10 is illustrated as a single-phase three-wire electrical distribution system including a neutral bus bar 24 extending vertically adjacent a rear wall of the box 12 and a pair of power bus bar structures 25 and 26 (FIGS. 4 and 5) feeding the main circuit breaker 23. At the output or load end of the circuit breaker 23, a pair of bus bars 29 and 30 electrically connect two poles of the circuit breaker respectively to a pair of horizontally extending bus bars 32 and 33 (FIG. 4) forming part of a stack 34 (FIGS. 2 and 5) of insulators and bus bars constructed generally in accordance with the disclosure of U.S. Pat. No. 3,354,357, issued Nov. 21, 1967.

The circuit breaker 23 is fastened to a mounting pan 36 secured to a left-hand side wall of the box 12 and braced by a bracket 37 having opposite end flanges secured respectively to the mounting pan 36 and the rear wall of the box 12. The bus bar and insulator stack 34 is fastened to an upper portion of a mounting pan 38 secured to the left-hand side wall of the box 12 and braced by a bracket 39 having opposite end flanges secured respectively to the mounting pan 38 and the rear wall of the box 12.

A plurality of relative large branch circuit breakers, which may be either of the type disclosed in U.S. Pat. No. 3,341,791, issued Sept. 12, 1967, or of the type disclosed in U.S. Pat. No. 3,345,591, issued Oct. 3, 1967, may be plugged onto the bus bars 32 and 33 from the lower edges thereof. In FIG. 5, three such two-pole circuit breakers 42 are shown. Preferably the circuit breakers 42 are provided with mounting brackets (not shown) and the mounting pan 38 is provided with corresponding rack-on and mounting holes (not shown) as disclosed in U.S. Pat. No. 3,346,777, issued Oct. 10, 1967.

Figure 3:
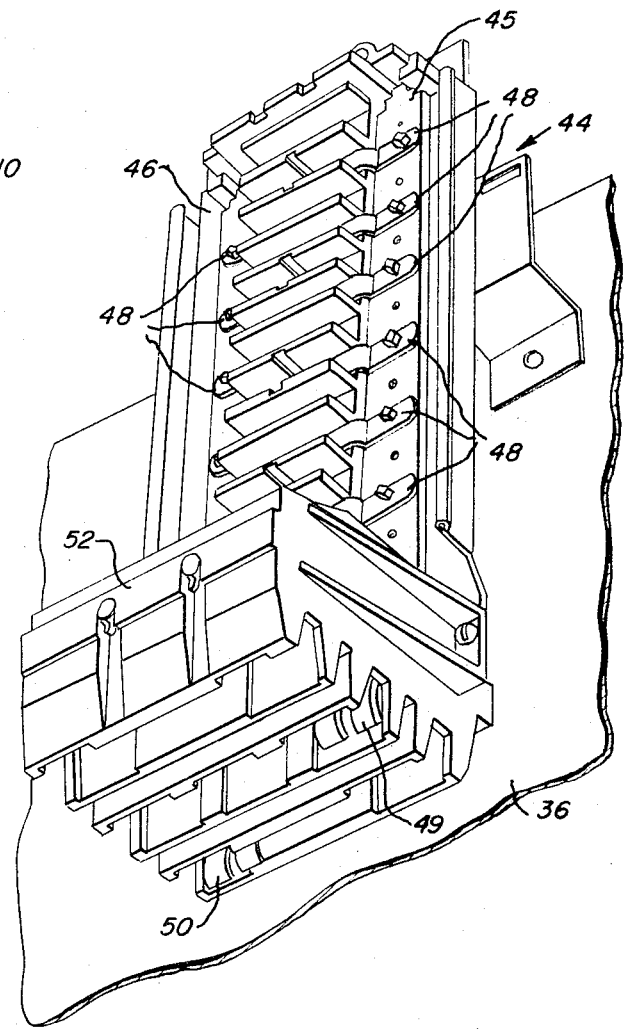
FIG. 3 is a perspective view of a circuit breaker panel for relatively small circuit breakers, the panel being usable in the service section switchboard of this invention.

Provision is made for installing relatively small circuit breakers, which cannot plug directly onto the bus bars 32 and 33, in the service section switchboard 10. FIG. 3 shows a circuit breaker panel 44 of the type more fully shown and described in copending application, Ser. No. 298,316, filed Oct. 17, 1972, and assigned to the assignee of this application. The panel 44 includes a pair of main bus bars 45 and 46 each having a plurality of branch bus bars 48 secured thereto and onto which relatively small circuit breakers, which may be either of the type disclosed in U.S. Pat. No. 2,902,560, issued Sept. 1, 1959, or of the type disclosed in U.S. Pat. No. 3,061,697, issued Oct. 30, 1962, may be plugged. The bus bars 45 and 46 are electrically connected respectively to plug-on jaw means 49 and 50 which are provided with an insulating shroud member 52 and which may be plugged respectively onto the bus bars 32 and 33 adjacent the main circuit breaker 23.

Additional circuit breakers 42 may be mounted on the right-hand portion of the mounting pan 38 as viewed in FIG. 5 and plugged onto lower edge portions of the bus bars 32 and 33 of the stack 34. Alternatively, an additional circuit breaker panel 44 may be mounted in place of additional circuit breakers 42.

Figure 2:
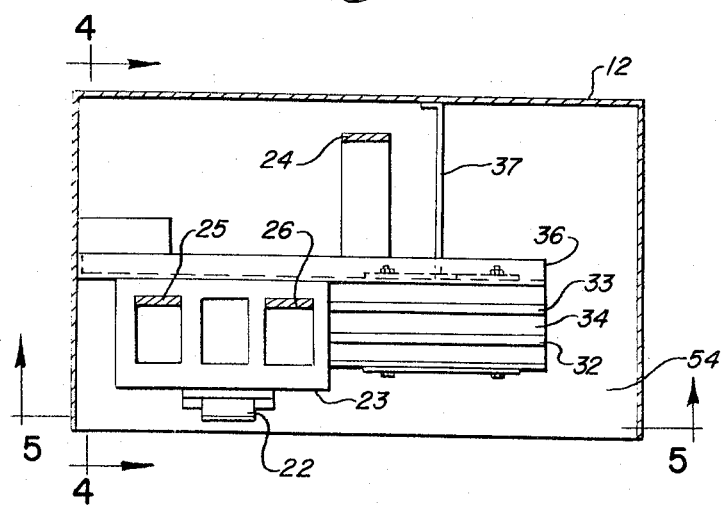
FIG. 2 is a sectional view taken generally along the line 2—2 of FIGS. 1 and 5, with certain parts omitted for simplicity.

With reference to FIGS. 2 and 5, space is provided between the mounting pans 36 and 38 and the right-hand side wall of the box 12 to provide a vertical wiring trough 54. Further, with reference to FIGS. 4 and 5, space is provided between the mounting pan 38 and the bottom of the box 12 to provide a horizontal wiring trough 56. When two circuit breaker panels 44 are installed respectively on the mounting pans 36 and 38 and plugged respectively onto upper and lower edge portions of the bus bars 32 and 33 and the relatively small circuit breakers are mounted on the panels, load side connectors of the circuit breakers will face the wiring trough 54. Load side connectors of the circuit breakers 42 will face the wiring trough 56. The arrangement makes optimum use of the space available within the box 12.

Various modifications may be made in the structure shown and described without departing from the spirit and scope of the invention.

We claim:

1. A service section switchboard comprising a box having a rear wall and a pair of opposite side walls, a mounting pan in the box generally parallel to and spaced from the rear wall and also spaced from one of the side walls to provide a vertically extending wiring trough along the one side wall and spaced from the bottom of the box to provide a horizontally extending wiring trough along the bottom of the box, a plurality of flat, elongated, flatwise aligned, horizontally extending bus bars mounted on the mounting pan with flat sides parallel to the rear wall of the box, a multipole main circuit breaker mounted in the box above the bus bars and adjacent the other of the side walls, poles of the main circuit breaker being electrically connected respectively to the bus bars, means for mounting relatively small branch circuit breakers in the box some with line terminals electrically connected to one of the bus bars and others with line terminals electrically connected to another of the bus bars and all with load terminals facing the vertically extending wiring trough, and means for mounting relatively large branch circuit breakers in the box below the bus bars with line terminals electrically connected respectively to the bus bars and with load terminals facing the horizontally extending wiring trough.

2. A service section switchboard as claimed in claim 1 wherein the mounting pan is secured to the other side wall and braced by a bracket secured thereto and to the rear wall of the box.

3. A service section switchboard as claimed in claim 1 including a second mounting pan in the box generally parallel to and spaced from the rear wall and also spaced from the one side wall, the main circuit breaker being mounted on the second mounting pan.

4. A service section switchboard as claimed in claim 3 wherein the second mounting pan is secured to the other side wall and braced by a bracket secured thereto and to the rear wall of the box.

* * * * *